US008034433B2

(12) United States Patent
Fai et al.

(10) Patent No.: US 8,034,433 B2
(45) Date of Patent: Oct. 11, 2011

(54) ARTICLE WITH A WRITING SURFACE AND METHOD OF MAKING AN ARTICLE WITH A WRITING SURFACE

(76) Inventors: Ng Chi Fai, Hong Kong (CN); Tse Hing Kan, Hong Kong (CN)

( * ) Notice: Subject to any disclaimer, the term of this patent is extended or adjusted under 35 U.S.C. 154(b) by 1032 days.

(21) Appl. No.: 11/162,625

(22) Filed: Sep. 16, 2005

(65) Prior Publication Data

US 2006/0269725 A1 Nov. 30, 2006

(51) Int. Cl.
*B32B 3/00* (2006.01)
*B29D 22/00* (2006.01)
*G09F 3/00* (2006.01)
*A47J 43/28* (2006.01)

(52) U.S. Cl. ......... 428/172; 428/34.1; 428/67; 428/192; 426/87; 206/217; 40/306; 30/322; 30/324

(58) Field of Classification Search ................. 428/42.1, 428/45, 67, 172, 192, 34.1, 35.7; 264/241, 264/328.1; 156/242, 295, 298; 40/209.1, 40/307, 314, 630, 299.01, 306; 434/408, 434/409, 413; 206/217; 426/87; 30/322, 30/324

See application file for complete search history.

(56) References Cited

U.S. PATENT DOCUMENTS

| | | | | |
|---|---|---|---|---|
| 4,011,673 | A * | 3/1977 | Levine | 40/641 |
| 4,135,512 | A * | 1/1979 | Godsey | 604/78 |
| 4,589,159 | A | 5/1986 | Streibel | |
| 5,079,851 | A * | 1/1992 | Sill | 33/760 |
| 5,461,748 | A * | 10/1995 | Koiduka | 15/161 |
| 5,604,006 | A * | 2/1997 | Ponchaud et al. | 428/67 |
| 6,082,030 | A | 7/2000 | Kesselring et al. | |
| 6,171,173 | B1 * | 1/2001 | Alcala et al. | 446/479 |
| 6,793,075 | B1 * | 9/2004 | Jeter | 206/459.1 |
| 2002/0071936 | A1 * | 6/2002 | Gentiluomo et al. | 428/167 |
| 2004/0187370 | A1 * | 9/2004 | Buzby | 40/324 |
| 2005/0166439 | A1 * | 8/2005 | Ludlow et al. | 40/665 |

* cited by examiner

*Primary Examiner* — Donald J Loney
(74) *Attorney, Agent, or Firm* — WRB-IP LLP

(57) ABSTRACT

An article including a writing surface includes a surface, a recess on the surface of the article, and a writing surface formed of a waterproof material disposed in the recess. A method of making an article with a writing surface includes providing an article with a recess in a surface of the article, and attaching a writing surface formed of a waterproof material in the recess.

17 Claims, 10 Drawing Sheets

ARTICLE WITH A WRITING SURFACE AND METHOD OF MAKING AN ARTICLE WITH A WRITING SURFACE

BACKGROUND AND SUMMARY

It is known to attach labels to articles to identify ownership or for other purposes. For example, labels may be provided on kitchenware such as cups, plates, and utensils to identify the user of the kitchenware articles. This can assist in preventing the spread of germs.

Typical labels are made of paper and attached to articles with adhesive. Paper deteriorates with time, particularly if exposed to the elements. For example, water will often disintegrate or wash off a paper label attached to an article by an adhesive. Paper labels are not well-suited for kitchenware articles that are typically and frequently cleaned in water.

Pen marks on paper labels are typically permanent, and pencil may not be able to clearly mark some labels that are typically marked with pen. In order to relabel an article marked with pen on paper, it is usually necessary to provide a new label to replace or cover the old label.

It is desirable to provide a label arrangement that can withstand exposure to the elements, particularly water. It is also desirable to provide a label arrangement that permits frequent relabeling.

In accordance with an aspect of the present invention, an article including a writing surface is provided. The article includes a surface, a recess on the surface of the article, and a writing surface formed of a waterproof material disposed in the recess.

In accordance with another aspect of the present invention, a method of making an article with a writing surface includes providing an article with a recess in a surface of the article, and attaching a writing surface formed of a waterproof material in the recess.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
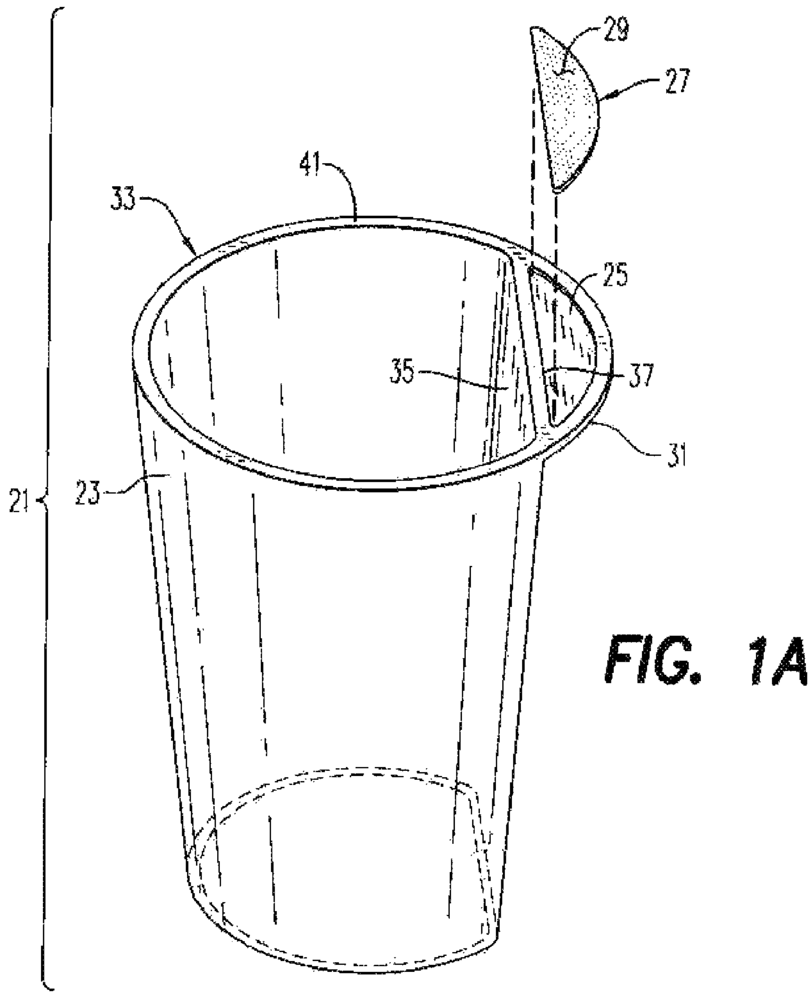
FIGS. 1A and 1B are an exploded perspective view and a top view, respectively, of an article according to an embodiment of the present invention.
Figure 1B:
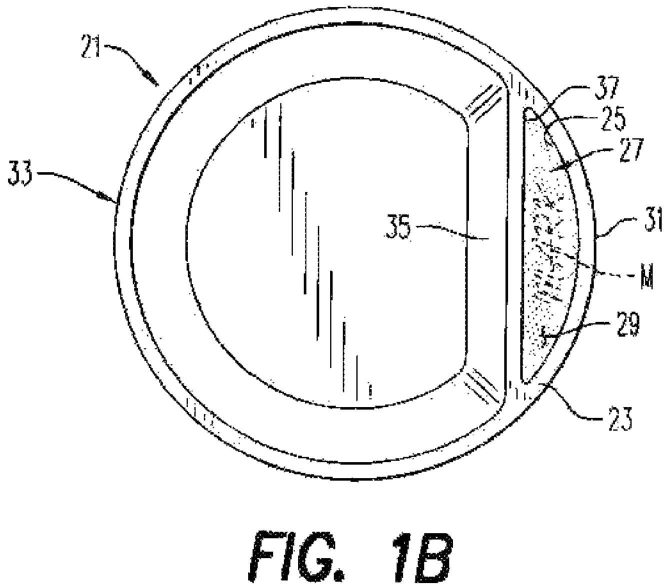
Figure 2:
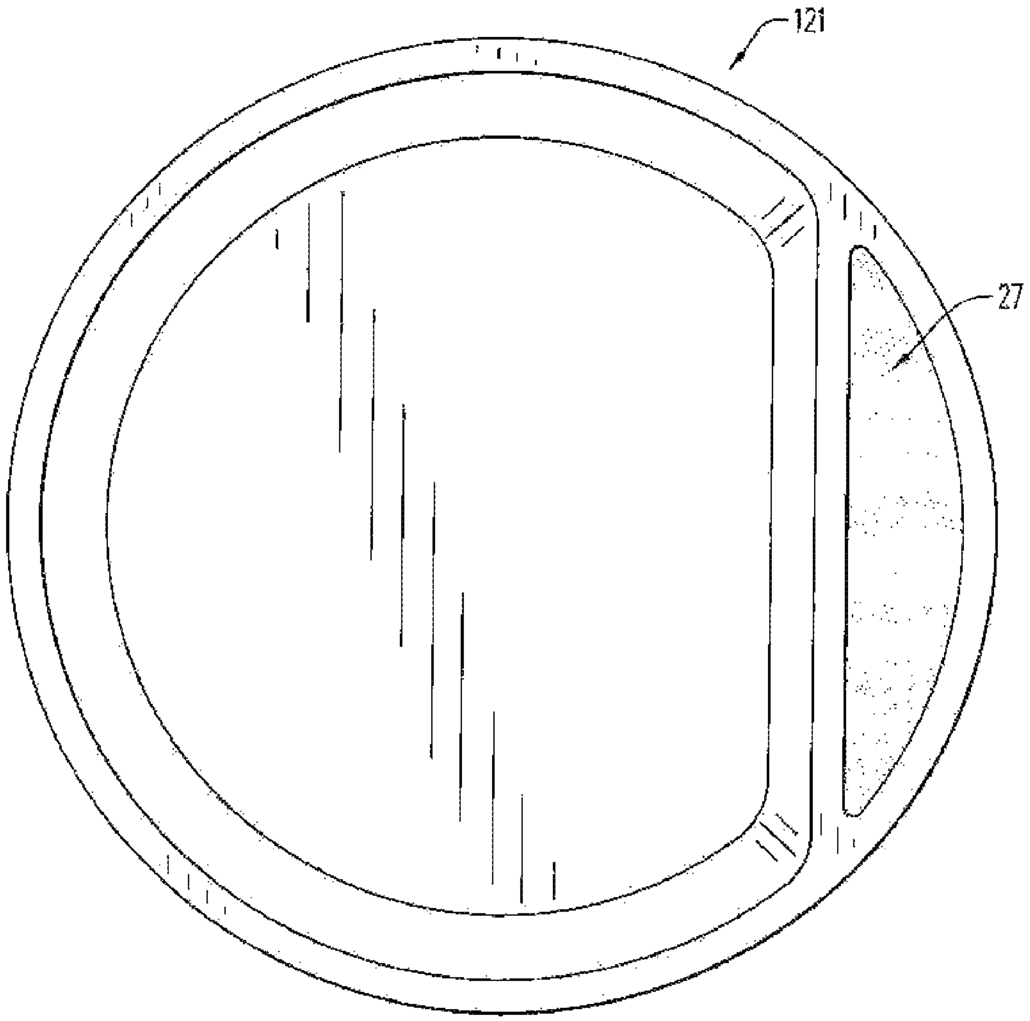
FIG. 2 is a top view of an article according to another embodiment of the present invention.
Figure 3:
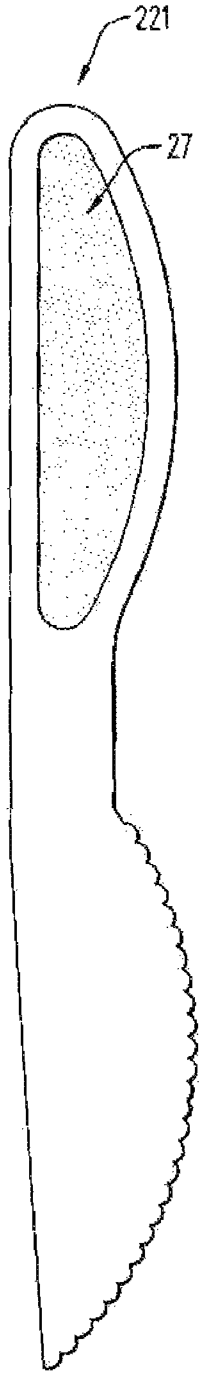
FIG. 3 is a top view of an article according to another embodiment of the present invention.
Figure 4:
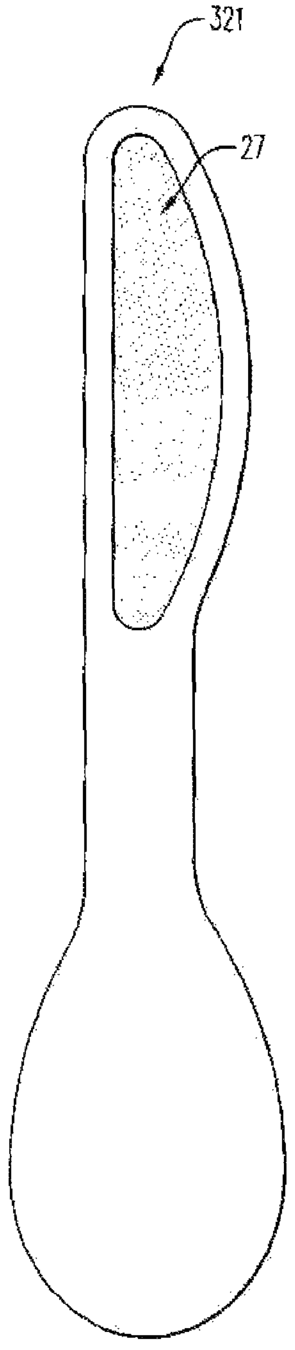
FIG. 4 is a top view of an article according to another embodiment of the present invention.
Figure 5:
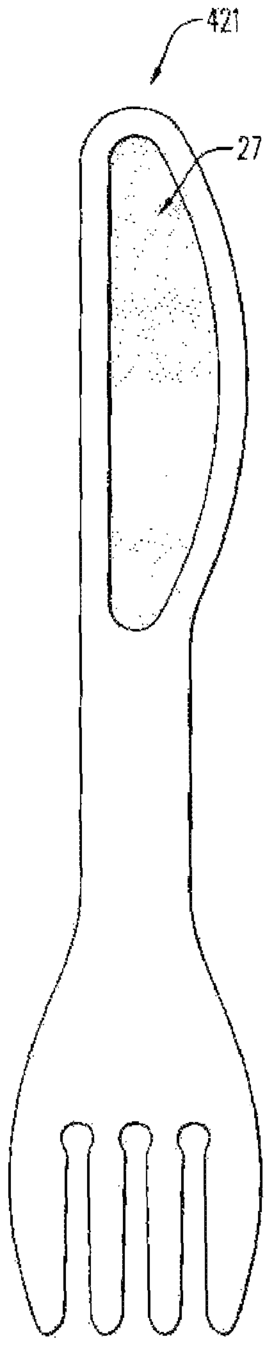
FIG. 5 is a top view of an article according to another embodiment of the present invention.

An article 21 according to an embodiment of the present invention is seen in FIGS. 1A-1B. The article 21 includes a surface 23, a recessed area 25 on the surface of the article, and a writing surface 27 formed of a waterproof material disposed in the recessed area. In the embodiment of FIGS. 1A-1B, the article 21 is a cup although the article can be substantially any article upon which it may be desirable to provide a writing surface. The writing surface 27 includes an outer surface 29 that can be substantially flush with the surface 23 of the article 21.

The writing surface 27 can be formed of a material on which pen and pencil markings M (shown in phantom in FIG. 1B) can be clearly made and from which pen or pencil markings are eraseable. The material will preferably be a material on which pen and pencil markings are clearly made using the same marking techniques as for making pen and pencil markings on paper, will not easily smear, but can be erased by rubbing the material, such as with a conventional pencil eraser. Preferred materials for the writing surface 27 are thermoplastic elastomer (TPE) materials.

The article 21 can be formed of any suitable material, such as a material to which the writing surface 27 can be conveniently adhered. For example, if the article 21 is formed of polypropylene, a TPE writing surface may be injection molded in the recess 25. Of course, a writing surface 27 made of TPE or other suitable material can be caused to adhere to the recess 25 by any suitable means, such as by being bonded by adhesive.

In the article 21 in the form of a cup the writing surface 27 can be provided in any suitable location on the cup. The writing surface 27 can be used for a number of purposes, and will often be used to indicate ownership or use by writing the name of the owner or user of the article on the writing surface. It is often desirable to provide the writing surface 27 on a portion of the cup that is substantially horizontal when the cup is in an ordinary, upright condition. Providing a writing surface 27 on a portion of an article 21 that is intended to be substantially horizontal when the article is in its ordinary position can facilitate reading of the information on the writing surface. To facilitate providing a writing surface 27 on a horizontal surface, the article 21 can be provided with a flange 31 that is horizontal when the article is in its ordinary position. The recess 25 can be provided in the flange 31.

In the article 21, the surface 23 of the article extends downwardly beneath the flange 31. The flange 31 can extend away from a center of the main body 33 of the article so that a portion 35 of the main body 33 connects to the flange 31 only along a portion 37 of the flange and in such a manner as to prevent any portion of the main body 33 from being disposed directly vertically beneath the flange. In the case of the cup shown in FIGS. 1A-1B, the upper lip 41 of the cup defines a circle for approximately 270°, with the remaining 90° of the circle being defined by the outer periphery of the flange 31. Beneath the flange 31, the portion 35 of the surface 23 of the article extending downwardly from the connecting portion 37 of the flange is substantially flat. In addition to creating an interesting appearance, such a shape can facilitate forming the article 21 in a mold, such as through an injection molding process.

Figure 6:
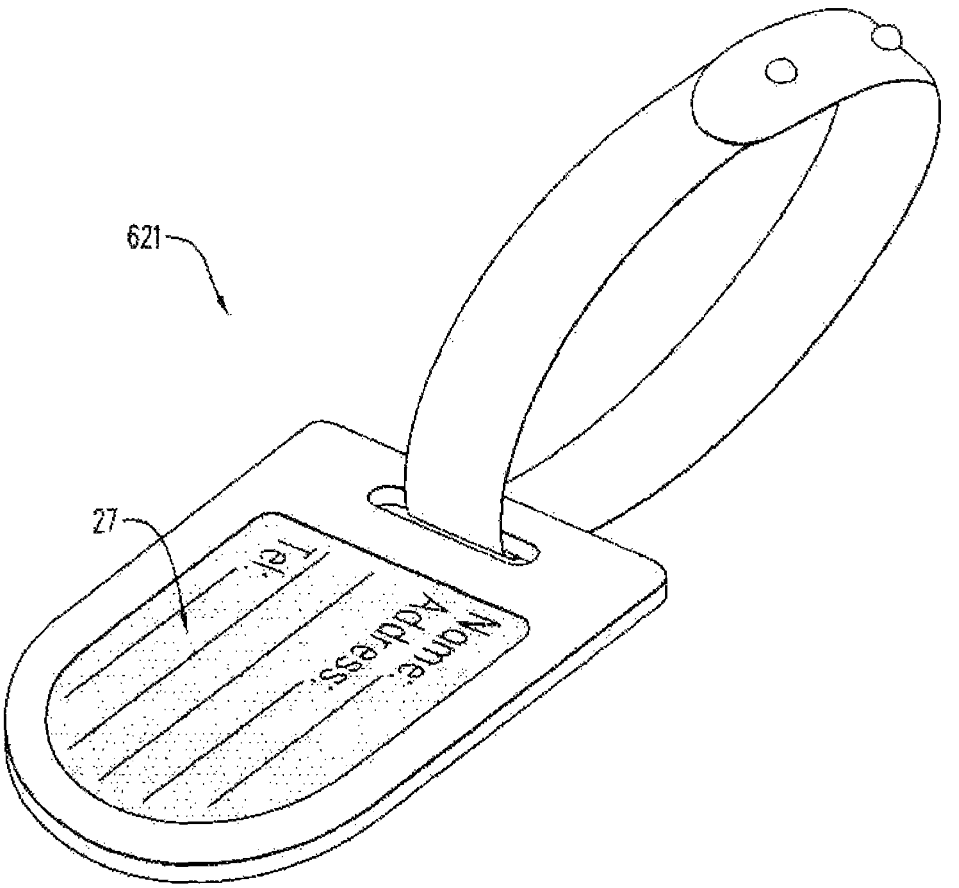
FIG. 6 shows a suitcase tag according to another embodiment of the present invention.
Figure 7:
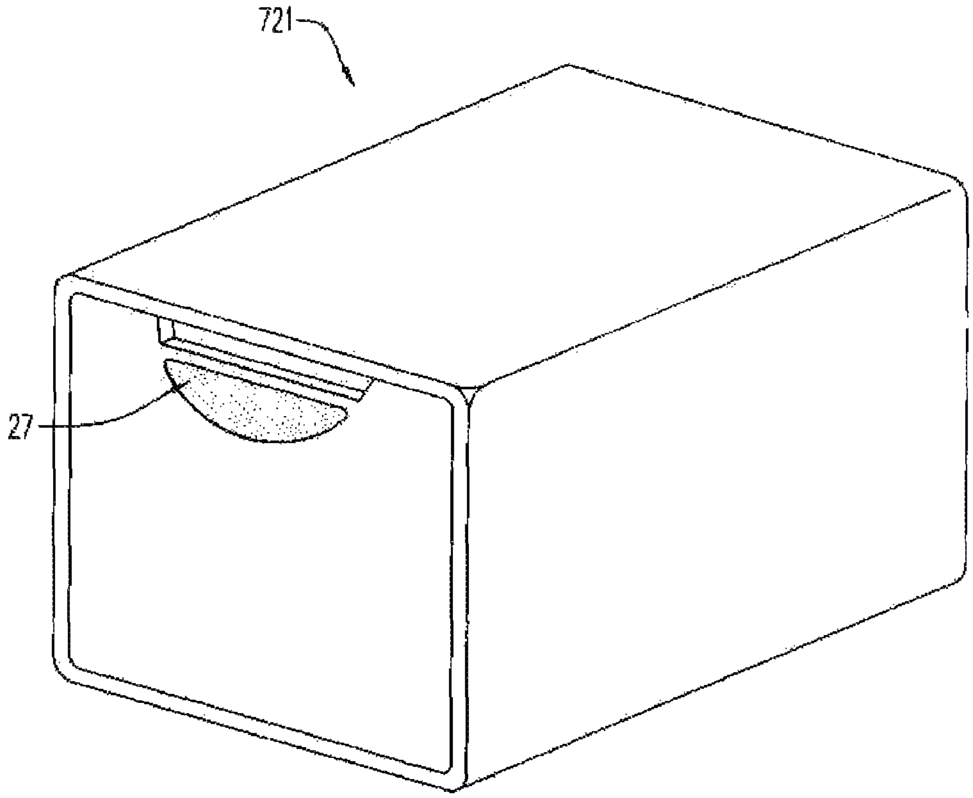
FIG. 7 shows a CD chest according to another embodiment of the present invention.
Figure 8:
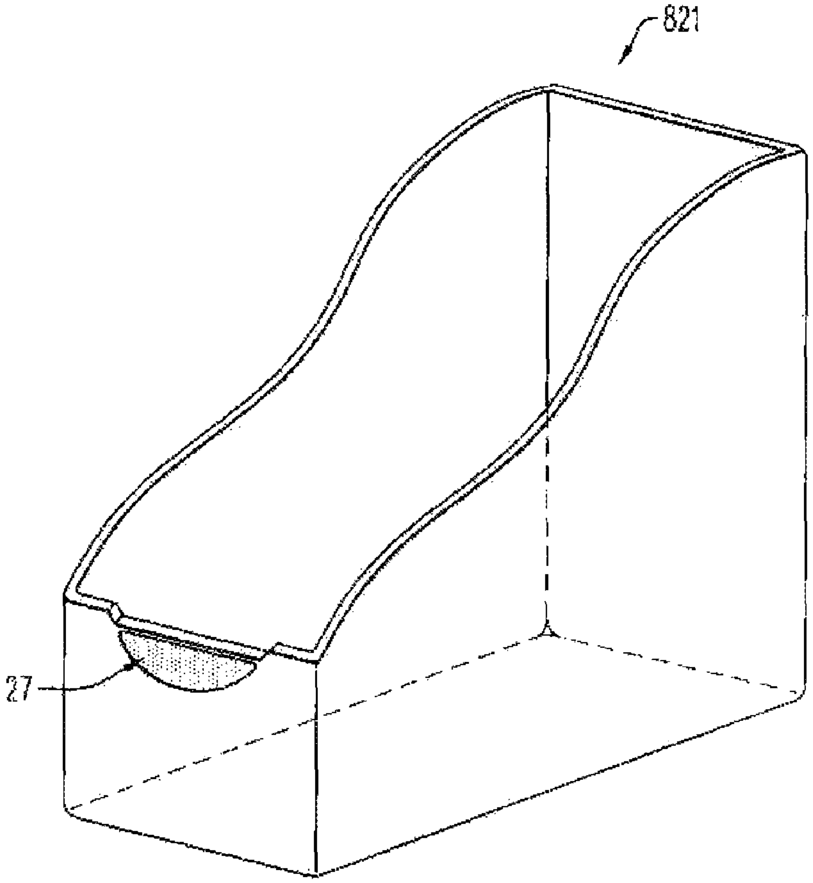
FIG. 8 shows a magazine file according to another embodiment of the present invention.
Figure 9:
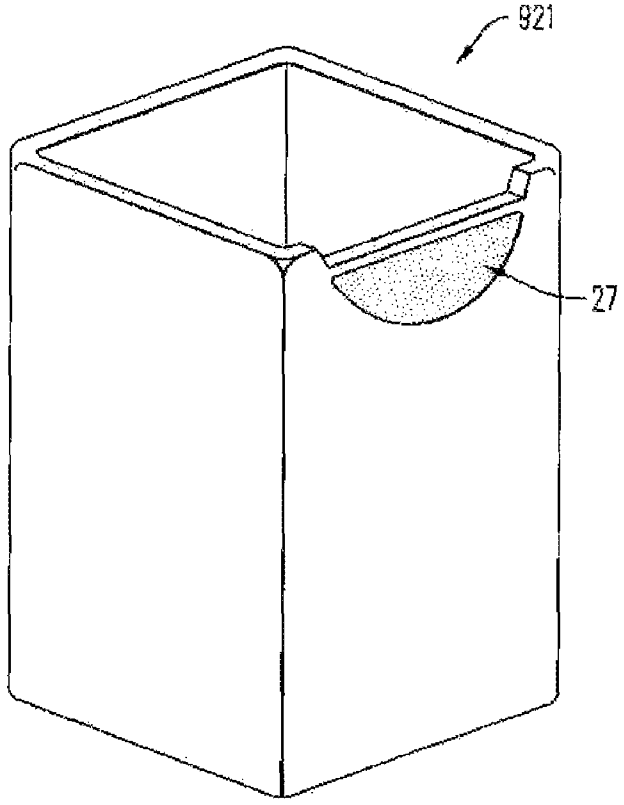
FIG. 9 shows a pen holder according to another embodiment of the present invention.
Figure 10:
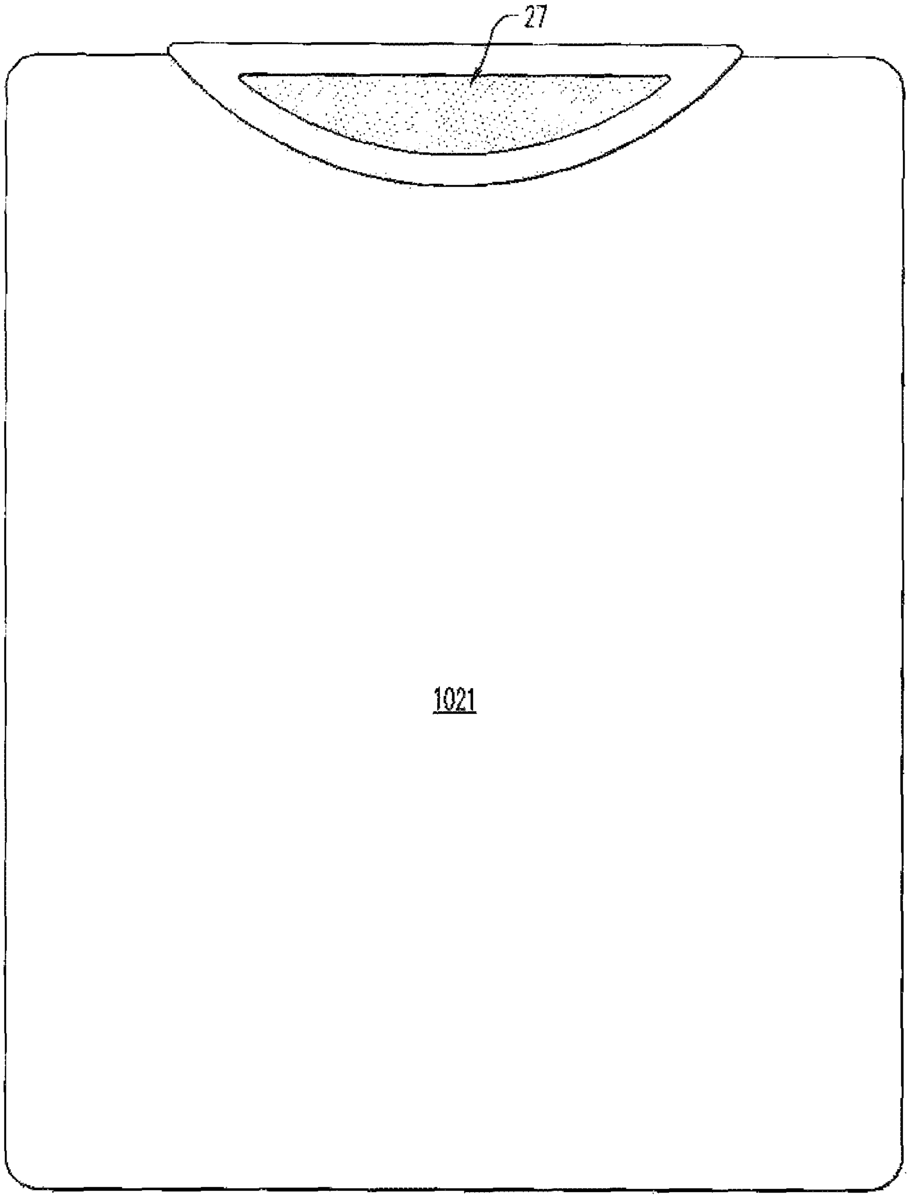
FIG. 10 shows a writing board according to another embodiment of the present invention.
Figure 11:
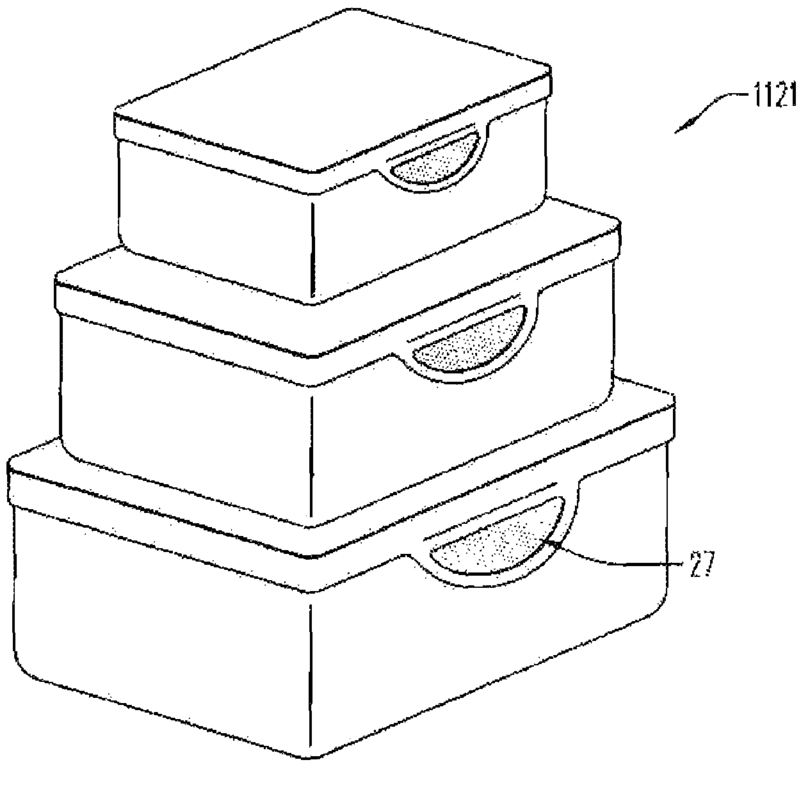
FIG. 11 shows a number of containers, each being a yet further embodiment of the present invention.
Figure 12:
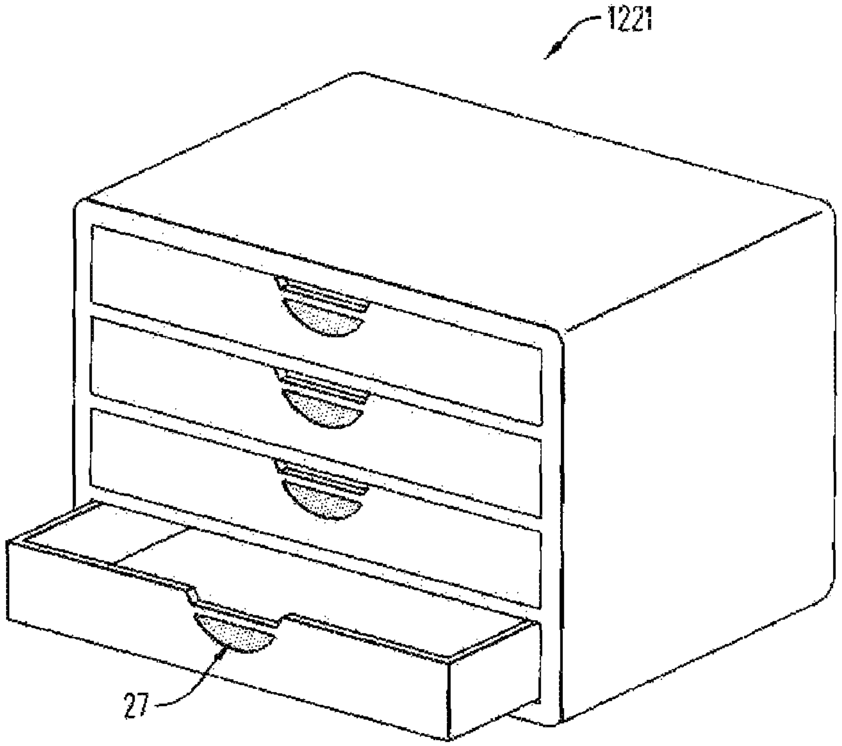
FIG. 12 shows a file chest according to another embodiment of the present invention.

Additionally, a non-circular shape of an article such as a cup can be desirable to prevent undesired rotation of the article in, for example, a cup-holder provided with a corresponding shape. A flange structure similar to that provided on the cup shown in FIGS. 1A-1B can be provided for other articles where a flange in two dimensions extends laterally to a substantial third dimension, such as in the plate 121 shown in FIG. 2, although the recess can, of course, be provided in any suitable location. In articles lacking a substantial third dimension, such as the knife 221, spoon 321, and fork 421 shown in FIGS. 3, 4, and 5, the recess 25 will ordinarily be provided on a suitable surface area of the article. The present invention has applications in kitchenware, as is shown in FIGS. 1A-5, as well as in any other article where it is desirable to provide a waterproof writing surface. For example, the invention may be realised in other articles, e.g. a suitcase tag 621 (as shown in FIG. 6), a CD chest 721 (as shown in FIG. 7), a magazine file 821 (as shown in FIG. 8), a pen holder 921 (as shown in FIG. 9), a writing board 1021 (as shown in FIG. 10), a container 1121 (as shown in FIG. 11), or a file chest 1221 (as shown in FIG. 12).

In a method of making an article 21 with a writing surface 27 according to an embodiment of the present invention, the article can be provided with a recess 25 in a surface 23 of the article. A writing surface 27 formed of a waterproof material is provided in the recess 25. The writing surface 27 can be attached in the recess 25 so that an outer surface 29 of the writing surface is substantially flush with the surface 23 of the article 21.

The writing surface 27 can be formed of TPE or any other suitable material and can be injection molded in the recess, or secured in the recess by adhesive or other suitable means. The article 21 can be formed by injection molding plastic, such as polypropylene.

While this invention has been illustrated and described in accordance with a preferred embodiment, it is recognized that variations and changes may be made therein without departing from the invention as set forth in the claims.

What is claimed is:

1. An article of kitchenware including a writing surface, the article being injection molded and including, a surface including a food contacting, surface a recess on the surface and a writing surface formed of a waterproof material that is receptive to pen or pencil markings and from which pen or pencil markings are eraseable by abrasion with a pencil eraser disposed in and joined directly to a surface of the recess, comprising a main body portion and a flange extending from the main body portion, the recess being provided in the flange.

2. The article as set forth in claim 1 wherein the writing surface includes an outer surface that is substantially flush with the surface of the article.

3. The article as set forth in claim 1 wherein the writing surface is formed of thermoplastic elastomer.

4. The article as set forth in claim 1 wherein the article is formed of polypropylene.

5. The article as set forth in claim 1, wherein the writing surface is injection molded in the recess.

6. The article as set forth in claim 1 wherein the writing surface is secured in the recess by adhesive.

7. The article set forth in claim 1, wherein the article is a drinking cup and the main body portion has an open top and a closed bottom, the flange being disposed proximate the top of the cup.

8. The article as set forth in claim 7, wherein no portion of the main body portion is disposed directly vertically beneath the flange.

9. The article as set forth in claim 1, wherein the article is a plate and the main body portion has an open top and a closed bottom, the flange being disposed proximate the top of the plate.

10. The article as set forth in claim 9, wherein no portion of the main body portion is disposed directly vertically beneath the flange.

11. An article of kitchenware, comprising a cylindrical body, the body having a food contacting surface, the article comprising a flange at a top of the article, the flange comprising a recess, and a writing surface formed of a waterproof material disposed in the recess, the writing surface being separate from the food contacting surface.

12. The article as set forth in claim 11, wherein no portion of the main body portion is disposed directly vertically beneath the flange.

13. The article as set forth in claim 11, wherein the writing surface is receptive to marking with ink markings such that the markings are resistant to removal by washing with water but are removable by abrasion with a pencil eraser.

14. The An eating or drinking utensil including a writing surface formed from a water-resistant material that is receptive to marking with ink markings such that the markings are resistant to removal by washing with water but are removable by abrasion with a pencil eraser, wherein the writing surface is formed of thermoplastic elastomer, comprising a main body portion and a flange extending from the main body portion, the writing surface being disposed in a recess being provided in the flange.

15. The eating or drinking utensil as set forth in claim 14, wherein the article is formed of polypropylene.

16. The eating or drinking utensil as set forth in claim 14, comprising a food contacting surface separate from the writing surface.

17. The eating or drinking utensil as set forth in claim 14, wherein no portion of the main body portion is disposed directly vertically beneath the flange.

* * * * *